United States Patent [19]

Barral

[11] Patent Number: 4,854,608
[45] Date of Patent: Aug. 8, 1989

[54] SAFETY BELT

[75] Inventor: Jacques Barral, Monaco, Monaco

[73] Assignee: Carl F. Schroth GmbH

[21] Appl. No.: 185,133

[22] Filed: Apr. 22, 1988

[30] Foreign Application Priority Data

Oct. 16, 1987 [DE] Fed. Rep. of Germany ....... 3735077

[51] Int. Cl.$^4$ .................................. B60R 22/28
[52] U.S. Cl. ................... 280/805; 280/808; 297/484; 297/486; 297/470
[58] Field of Search ............... 280/805, 808; 297/470, 297/483, 484, 486

[56] References Cited

U.S. PATENT DOCUMENTS

| 4,027,905 | 6/1977 | Shimogawa et al. | 280/805 |
| 4,588,208 | 5/1986 | Yoshitsuau | 280/805 |
| 4,662,487 | 5/1987 | Koch | 280/805 |

FOREIGN PATENT DOCUMENTS

| 1903055 | 8/1970 | Fed. Rep. of Germany | 280/805 |
| 2615819 | 10/1977 | Fed. Rep. of Germany | 297/484 |

Primary Examiner—Kenneth R. Rice
Attorney, Agent, or Firm—Toren, McGeady & Associates

[57] ABSTRACT

A safety belt for racing cars and rally sports cars which includes two shoulder belts and a lap belt which can be coupled to the shoulder belt by means of a buckle. The belts are at least indirectly fastened to the car frame. In the two shoulder belts of the safety belt, the kinetic energy resulting from an impact is converted to a different extent and the conversion of the kinetic energy takes place in the shoulder belts within time periods which are shifted relative to each other. As a result, the two shoulder belts are elongated asymmetrically and permit a rotation of the torso of the driver and a subsequent forward displacement of one shoulder relative to the other shoulder.

6 Claims, 4 Drawing Sheets

SAFETY BELT

BACKGROUND OF THE INVENTION

1. Field of the Invention

The present invention relates to a safety belt. More particularly, the invention relates to a safety belt for racing cars and rally sports cars which include two shoulder belts and a lap belt which can be coupled to the shoulder belts by means of a buckle. The belts are at least indirectly fastened to the car frame.

2. Description of the Prior Art

Safety belts with four, five or six anchoring points are known. These safety belts are used primarily in racing cars, rally cars or sports cars. Generally, the safety belts consist of two shoulder belts, a lap belt and in some cases even two thigh belts.

The particularly shaped structure of such safety belts has the purpose to ensure optimum immobilization of the driver of the car during the competition.

By means of safety belts of the above-described type, each part of the body of the driver is firmly and symmetrically pressed against the backrest of the seat. For this purpose, the belt has two shoulder belts which extend over the shoulders and at least one so-called lap belt which surrounds and holds the lap or pelvis of the driver.

However, it has been found that the driver is insufficiently secured by means of the above-described safety belts. This insufficient securing of the driver is due to various dynamic phenomena which were determined in crash tests of a test vehicle with an antropomorphic, instrumented dummy.

The crash tests were carried out in accordance with the requirements of EWG 77/541 for impacts at 50 km/h and a braking curve.

The most apparent difficulties and disadvantages which were determined as a result of the above-mentioned test method in the known safety belts are as follows:

1. The so-called submarining phenomenon which means that the lap belt slides from its known position over the pelvic ridge and is displaced onto the soft portions of the abdomen. As a result, the danger of serious injuries in the area of the abdomen (kidneys, liver, bowels, spleen) exists.

2. It has been found that the resulting acceleration at the chest may be 60 g and more, which is to be considered the maximum permissible value in accordance with U.S. standard 208.

3. Another negative phenomenon occurring in the use of the known safety belts is that the permissible maximum limit of the head injury criteria value (HIC) is exceeded. This HIC value is determined in accordance with U.S. standard 208 as shown below and is fixed at 1000.

$$HIC_{max} = \left[ \frac{1}{t_z - t_1} a \cdot d_t \right]^{2.5} \cdot (t_z - t_1)$$

The above value has been recognized in the international standards as a valid value for testing the protective system for the user of the belt.

The HIC value is reached by the head at the time of impact when the head is violently jolted forwardly as the sternum forcibly hits the safety belt and when the head is simultaneously turned downwardly, so that the value resulting at the chest exceeds the permissible maximum value of 60 g.

Moreover, it has been found that the symmetric forward displacement of the upper body, i.e. chest, arms and head, during the impact is a result of the fact that the kinetic energy E of the body at the time of impact is divided into two equal portions $E_1$ and $E_2$ which are absorbed and dissipated by the two shoulder belts of the known safety belts over equal time periods $t_1$ and $t_2$. Thus, the shoulders are displaced forwardly in a symmetrical manner.

The above-described difficulties and disadvantages result from the above-mentioned symmetrical displacement in conjunction with a low elongating or stretching capability of the safety belts.

Of course, if safety belts with thigh belts are used, the submarining phenomenon can be eliminated by means of the thigh belts. However, the risk of injuries to the groin in case of impact are substantially increased.

Even when safety belts with five or six anchoring points and with thigh belts are used, the above-mentioned 60 g value at the chest and the 1000 HIC is frequently easily exceeded.

It is, therefore, the primary object of the present invention to provide a safety belt in which the disadvantages and difficulties of known safety belts resulting from the uniform displacement of the body during an impact are eliminated.

SUMMARY OF THE INVENTION

In accordance with the present invention, a safety belt of the above-described type is provided in which the kinetic energy resulting from an impact is converted in the two shoulder belts to a different extent and the conversion of the kinetic energy takes place in the shoulder belts within time periods which are shifted relative to each other. As a result, the two shoulder belts are elongated asymmetrically and permit a rotation of the torso and a subsequent forward displacement of one shoulder relative to the other shoulder.

The conversion of different kinetic energy portions $E_1$ and $E_2$ of the body within tow time periods $t_1$ and $t_2$ which are shifted relative to each other can be obtained in the following two manners:

1. by equipping at least one shoulder belt with at least one device for absorbing the kinetic energy, wherein the device is capable of changing the elongating capability of one shoulder belt relative to the other shoulder belt, or 2. by two shoulder belts with different elongating capabilities upon impact.

The various features of novelty which characterize the invention are pointed out with particularity in the claims annexed to and forming a part of this disclosure. For a better understanding of the invention, its operating advantages and specific objects attained by its use, reference should be had to to the drawings and descriptive matter in which are illustrated and described preferred embodiments of the invention.

DETAILED DESCRIPTION OF THE INVENTION

Figure 1:
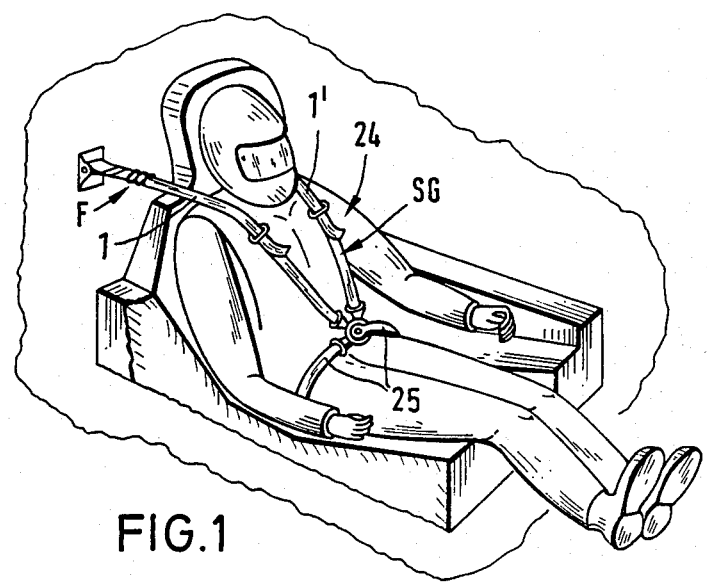
FIG. 1 is a schematic and perspective view of a safety belt with four anchoring points placed on a dummy.
Figure 2:
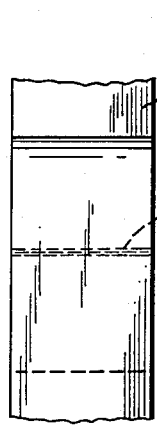
FIG. 2 is partial top view, on a larger scale, of a shoulder belt of the safety belt of FIG. 1.
Figure 3:
FIG. 3 is a side view of the shoulder belt portion shown in FIG. 2.

As illustrated in FIGS. 1 to 3 of the drawing, a portion of the length of a shoulder belt 1 of a four-point safety belt SG has a double S-shaped fold F which is held together in the middle by means of a seam 2. The seam 2 is prepared in such a way that it tears at a predetermined load when the kinetic energy is converted.

Figure 4:
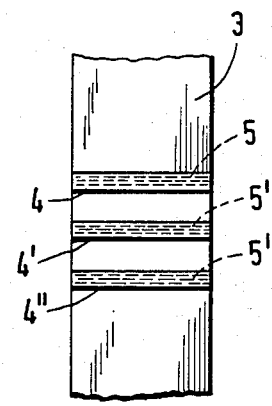
FIG. 4 is a partial top view, also on a larger scale, of a second embodiment of a shoulder belt of the safety belt of FIG. 1.
Figure 5:
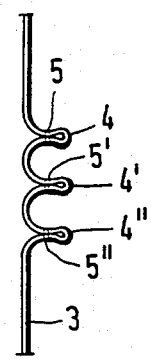
FIG. 5 is a side view of the shoulder belt portion shown in FIG. 4.

FIGS. 4 and 5 of the drawing show a second embodiment of an energy converting device. In this case, the shoulder belt 3 is pleated in the manner of a bellows with three loops 4, 4', 4". The loops 4, 4', 4" have in the middle of the length thereof a seam 5, 5', 5", respectively. The seams 5, 5', 5" are also prepared in such a way that they tear under a given load, so that the shoulder belt 3 is elongated and the kinetic energy is converted in this manner.

Figures 6, 7:
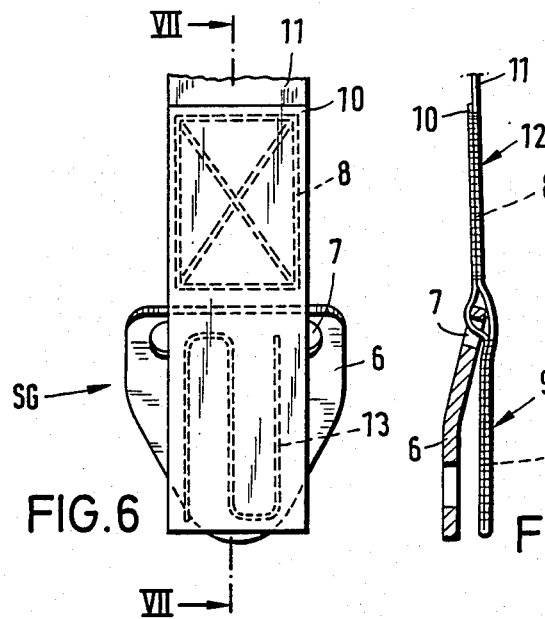
FIG. 6 is a partial top view, also on a larger scale, of a third embodiment of a shoulder belt of the safety belt of FIG. 1.
FIG. 7 is a longitudinal sectional view of the shoulder belt portion shown in FIG. 6 taken along line VII—VII.

FIGS. 6 and 7 show a third embodiment of a safety belt SG with an energy converting device.

The embodiment of FIGS. 6 and 7 has an end claw 6 which is generally anchored to the vehicle frame.

An end portion 10 of the shoulder belt 11 extends initially approximately parallel to end claw 6, is then deflected by 180° below the oblong hole 7 of end claw 6 and is subsequently guided through the oblong hole 7.

The resulting double-layer portions 9 and 12 have connecting seams 8 and 13.

The energy conversion is effected by S-shaped seam 13 which is provided in the portion 9 provided underneath oblong hole 7. Seam 13 tears when subjected to a predetermined load.

Figures 8, 9, 10, 11:
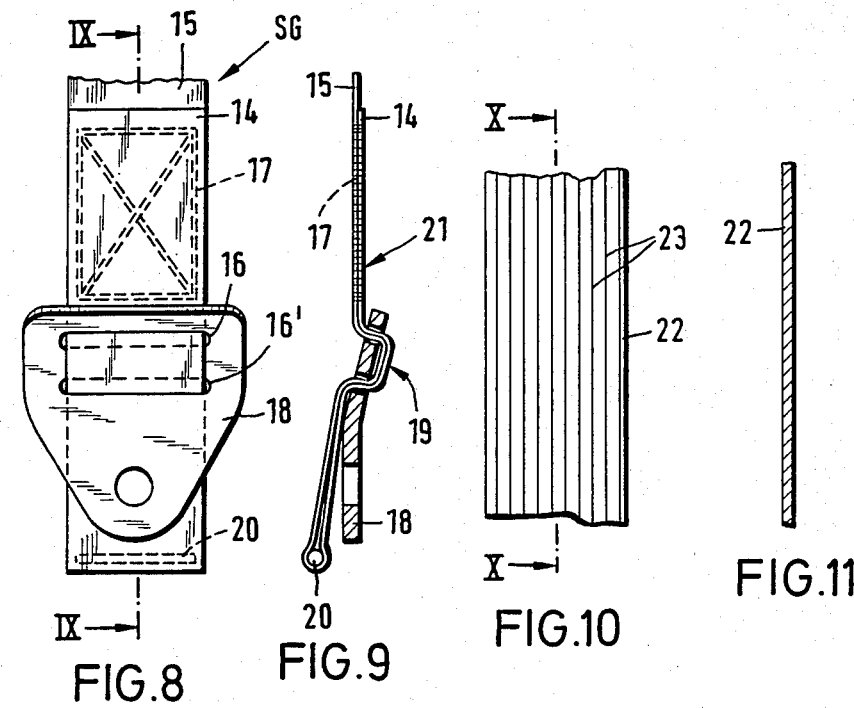
FIG. 8 is a partial top view, also on a larger scale, of a fourth embodiment of a shoulder belt of the safety belt of FIG. 1.
FIG. 9 is a longitudinal sectional view of the shoulder belt portion shown in FIG. 8 taken along line IX—IX.
FIG. 10 is a partial top view, also on a larger scale, of a fifth embodiment of a shoulder belt of the safety belt of FIG. 1.
FIG. 11 is a longitudinal sectional view of the shoulder belt portion shown in FIG. 10 taken along line X—X.

FIGS. 8 and 9 show a fourth embodiment of a safety belt SG with energy converting device.

The fourth embodiment includes essentially a shoulder belt 15 with a double-layer portion 21 obtained by folding the end portion 14 by 180° and connecting the layers by means of a seam 17. The portion 21 is guided in the manner of a S through two parallel slots 16, 16' of a fastening claw 18 to form a clamping or sliding winding 19.

A bolt 20 arranged within the double-layer portion 21 at the end thereof exerts a clamping action on the portion 21 at the end of the sliding procedure through the slots 16, 16'.

In the fourth embodiment of the present invention, the energy conversion is provided by the sliding friction occurring when the double-layer portion 21 slides within the slots 16, 16'.

FIGS. 10 and 11 show a fifth embodiment of the energy conversion. This embodiment includes essentially a belt 22 which is a woven yarn warp band 23. Accordingly, belt 22 is capable is capable of an elongation which is at least 15% higher than elongations obtainable in conventional safety belts when subjected to a tensile load of 400 kg.

For example, belt 22 may be manufactured of a polypropylene fiber or another elastic fiber which is suitable with or without the addition of other materials to effect the desired elongation of the belt 22 for the purpose of converting the kinetic energy.

The diagrams illustrated in FIGS. 12 through 19 shall now be described.

Figure 12:
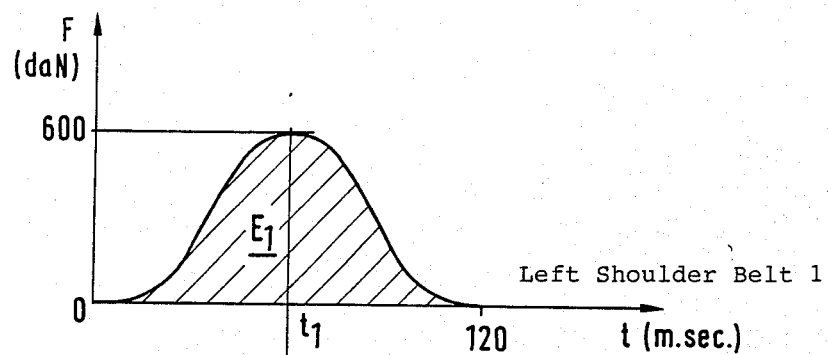
FIGS. 12 and 13 are sequence diagrams of a time-dependent energy conversion of shoulder belts after a defined crash test, wherein a dummy is supported by means of a known safety belt.
Figure 13:
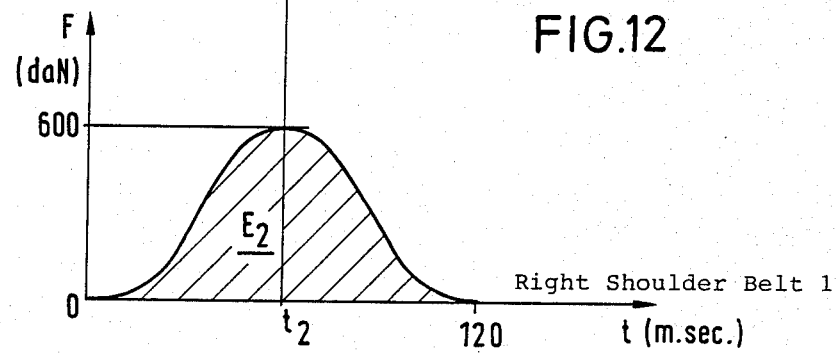

FIGS. 12 and 13 are sequence diagrams of the time-dependent energy conversion in a crash test with a dummy 24 supported by means of a four-point safety belt SG as it is illustrated in FIG. 1, wherein the shoulder belts 1, 1' do not have elongating capability for the purpose of energy conversion.

Both curves of FIGS. 12 and 13 show the pattern of the forces acting simultaneously on the two shoulder belts 1, 1', i.e. the right and left shoulder belts. The forces are represented in daN.

The zero point of each diagram is the origin of coordinates, wherein the time t is plotted against the abscissa in thousands of a second and the force is plotted against the ordinate in daN. The area $E_1$, $E_2$ enclosed by each of the above-mentioned curves depends upon the energy converted by the two shoulder belts 1, 1', wherein E refers to the left shoulder belt 1 and $E_2$ refers to right shoulder belt 1'.

In the specific example, it can be seen that the two shoulder belts 1, 1' without energy conversion behave dynamically symmetrically. It is particularly apparent that 1. the maximum value of the two shoulder belts 1, 1' is reached essentially in the same moment, i.e. $t_1$ and $t_2$ coincide, 2. the maximum value of the right shoulder belt 1 is the same as that of the left shoulder belt 1', 3. the areas $E_1$ and $E_2$ are equal.

Figure 14:
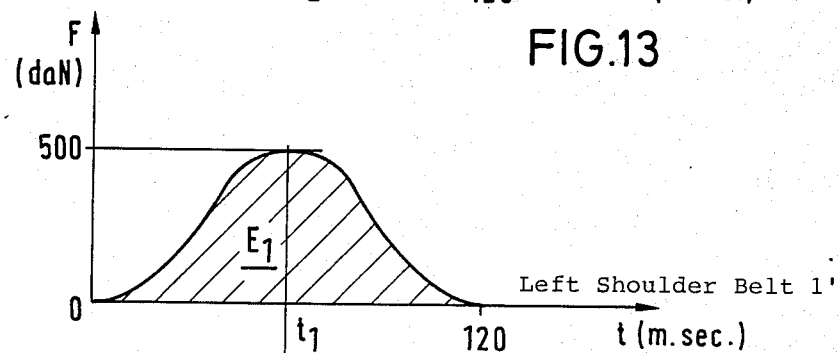
FIGS. 14 and 15 are sequence diagrams of a time-dependent energy conversion of shoulder belts after a defined crash test, wherein the dummy is supported by a safety belt according to FIGS. 2 to 5.
Figure 15:
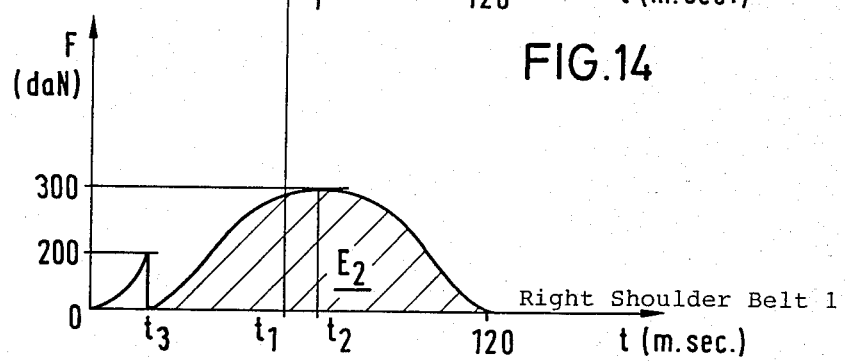

FIGS. 14 and 15 are sequence diagrams of the time-dependent energy conversion in a crash test with a dummy 24 supported by means of a safety belt SG. An energy conversion of the type illustrated in FIGS. 2 and 3 or 4 and 5 is realized in the right shoulder belt 1 or 3

(FIG. 15), while the shoulder belt 1' on the left is of the normal type (FIG. 14). In the specific example, the dynamically asymmetrical behavior of the two shoulder belts 3, 1' is illustrated. It is particularly apparent that 1. the maximum value is reached at different times, wherein the first maximum value at $T_1$ refers to the shoulder belt 1' without energy conversion, while the second maximum value at $T_2$ refers to the shoulder belt 3 with energy conversion, 2. the maximum value of the shoulder belt 1 without energy conversion is greater, and 3. the energies converted by the two shoulder belts 3, 1' are substantially different, because the two surfaces $E_1$ and $E_2$ are substantially different, with $E_1$ being greater than $E_2$.

In addition, as seen in FIG. 15, a low maximum value occurs prior to $T_1$ and $t_2$ at $t_3$ due to the tearing of the seam 2 or 5, 5', 5'' of the energy converting device.

Figure 16:
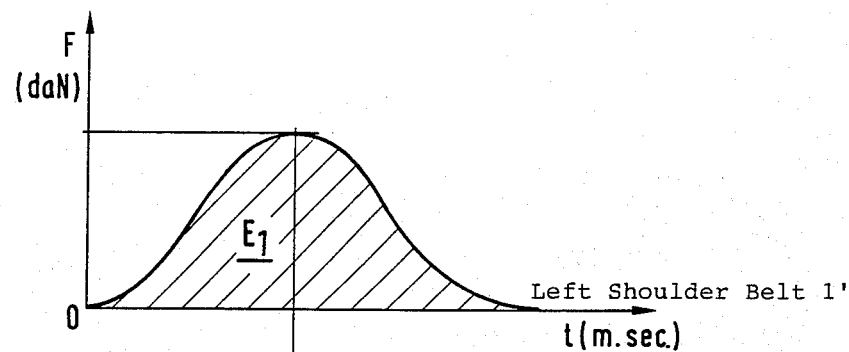
FIGS. 16 and 17 are sequence diagrams of a time-dependent energy conversion of shoulder belts after a defined crash test, wherein the dummy is supported by a safety belt according to FIGS. 6 to 9.
Figure 17:
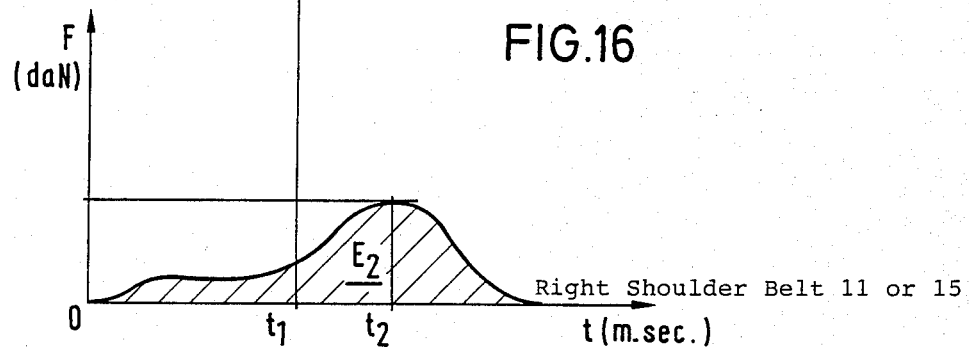

FIGS. 16 and 17 are sequence diagrams of the time-dependent energy conversion in a crash test with a dummy 24 supported by means of a safety belt SG, wherein an energy conversion of the type illustrated in FIGS. 6 to 9 is realized in the right shoulder belt 11, 15.

In the specific example, the dynamically asymmetrical behavior of the two shoulder belts 11, 1' or 15, 1' is illustrated. FIG. 16 refers to the shoulder belt 1' having no energy converting device, while FIG. 17 refers to shoulder belt 11, 15 which is provided with an energy converting device.

It is particularly apparent that 1. the maximum value is reached at different times, wherein the first maximum value $t_1$ refers to the shoulder belt 1' without energy converting device, while the second maximum value at $T_2$ refers to shoulder belt 11, 15' which has the energy converting device.

2. the maximum value for the shoulder belt 1' without energy converting device is higher, and 3. the energies converted by shoulder belts 11, 15 are substantially different from those at 1', wherein $E_1$ is greater than $E_2$.

In the example of FIGS. 16 and 17, the orders of magnitude, the maximum values, the durations as well as the time periods until the maximum values are reached, the phase differences between the two curves and the energy content are essentially the same as in the example of FIGS. 14 and 15.

However, in the example of FIGS. 16 and 17, the curve referring the shoulder belt 11, 15, i.e., the shoulder belt provided with the energy conversion, does not have the distinct low initial maximum value that can be seen in FIG. 15. Specifically, the curve in FIG. 17 does not show a drop to zero of the force applied by the shoulder belt 11, 15 onto the shoulder with the unavoidable biomechanical stresses. Rather, the curve of FIG. 17 shows a uniformly flat load curve which is due to the uniformly increasing braking of the energy converting device 13 illustrated in FIGS. 6 and 7 or due to the sliding friction which is constantly applied by the energy converting device 19 illustrated in FIGS. 8 and 9.

Figure 18:
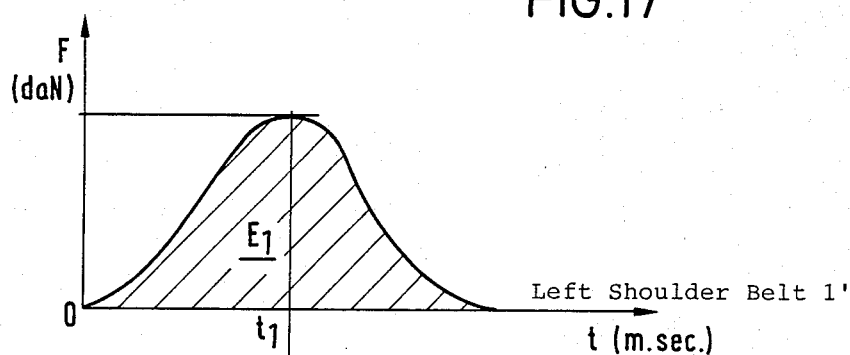
FIGS. 18 and 19 are sequence diagrams of a time-dependent energy conversion of shoulder belts after a defined crash test, wherein the dummy is supported by a safety belt according to FIGS. 10 to 11.
Figure 19:
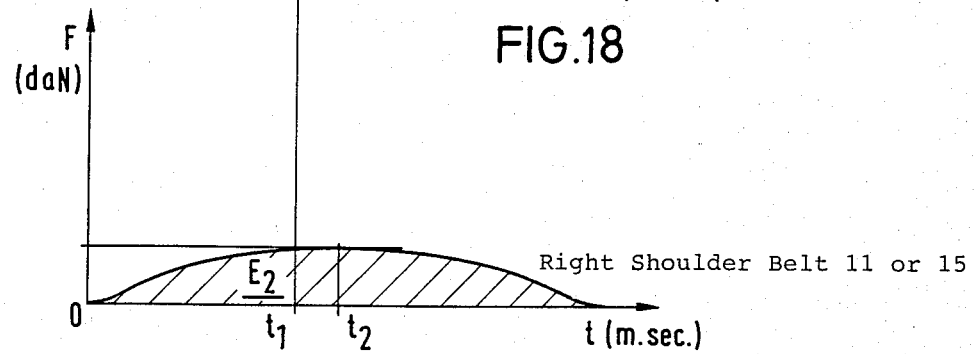

FIGS. 18 and 19 are sequence diagrams of the time-dependent energy conversion in a crash test with a dummy 24 supported by means of a safety belt of the type illustrated in FIGS. 10 and 11, wherein the elongating capability of the right shoulder belt 22 is at least 15% higher than the elongating capability of the left shoulder belt 1'.

In the example of FIGS. 18 and 19, the orders of magnitude, the maximum values, the durations as well as the time periods until the maximum values are reached, the phase differences between the two curves and the energy constants are essentially the same as those in the diagrams of FIGS. 14 and 15.

It is emphasized that the curve which refers to the shoulder belt 22 with energy converting device 23 does not have a low maximum value, as is the case in FIG. 15, and does not have a flat constant curve portion, as is the case in FIG. 17. Rather, the curve of FIG. 19 follows the bell-shaped pattern of the curve of FIG. 18, although the maximum value is lower.

Due to the rotation of the torso and the significant forward displacement of the chest during a crash, the sliding or submarining effect of the pelvis underneath the lap belt 25 is eliminated. This is true even if dummy 24 sits on a seat that is conventionally mounted in a motor vehicle, i.e., a seat which is substantially less hard and sagging than a seat used in racing cars rally cars, or sports cars.

In addition, for the above-mentioned reasons, the hard impacts of the head against the sternum results in sliding which not only has longitudinal but also lateral and perpendicular components, so that the g-number at the sternum is reduced and the maximum HIC value is also reduced to below 1000.

While specific embodiments of the invention have been shown and described in detail to illustrate the application of the inventive principles, it will be understood that the invention may be embodied otherwise without departing from such principles.

I claim:

1. In a safety belt to be worn by a driver of a car, the safety belt including two shoulder belts and a lap belt, and a buckle for coupling the lap belt to the shoulder belt, wherein the belts are at least indirectly fastened to the car frame, the improvement comprising the shoulder belts including means for converting the kinetic energy resulting from an impact of the car to a different extent and for converting the kinetic energy in the two shoulder belts in time periods which are shifted relative to each other, so that the two shoulder belts are elongated asymmetrically and permit a rotation of the torso of the driver and a subsequent forward displacement of one shoulder of the driver relative to the other shoulder.

2. The safety belt according to claim 1, wherein at least one of the shoulder belts includes an energy converting means, the energy converting means being a loop in the shape of a double-S held together by means of a transverse seam.

3. The safety belt according to claim 1, wherein at least one of the shoulder belts includes an energy converting means, the energy converting means being one or more loops, each loop being held together by means of a transverse seam, the loops forming a bellow-type configuration.

4. The safety belt according to claim 1, wherein at least one of the shoulder belts includes an energy converting means, the energy converting means including an anchoring claw at least indirectly connected to the car frame, the anchoring claw defining an oblong hole, the shoulder belt with the energy converting means having an end portion, the end portion extending past the anchoring claw and being folded onto itself, the folded portion extending through the oblong hole, wherein the folded portions of the belt portion are held together by means of seams provided on both sides of the oblong hole.

5. The safety belt according to claim 1, wherein at least one of the shoulder belts includes an energy converting means, the energy converting means including an anchoring claw at least indirectly connected to the car frame, the anchoring claw defining two slots, the shoulder belt with the energy converting means having an end portion, the end portion being folded around a bolt extending transversely of the belt, wherein the end portion of the belt extends through the two slots, so that the belt is movable relative to the anchoring claw against a clamping resistance.

6. The safety belt according to claim 1, wherein one of the shoulder belts is a woven warp yarn band.

* * * * *